United States Patent [19]

Aston et al.

[11] Patent Number: 4,551,384
[45] Date of Patent: Nov. 5, 1985

[54] BOARDS

[75] Inventors: Geoffrey W. Aston, Horsham; Susan Smith, Crawley; Paul Chapman; Howard A. Barker, both of Horsham, all of England

[73] Assignee: Redland Technology Limited, Reigate, England

[21] Appl. No.: 614,208

[22] Filed: May 25, 1984

[30] Foreign Application Priority Data

Jun. 2, 1983 [GB] United Kingdom ............... 8315164

[51] Int. Cl.⁴ .................. B32B 5/18; B32B 9/04; B32B 19/00
[52] U.S. Cl. .................. 428/312.6; 156/78; 156/79; 162/101; 162/181.8; 428/317.9; 428/318.4
[58] Field of Search .......... 156/78, 79; 162/101, 162/123, 181.8; 428/312.6, 312.8, 317.9, 318.4

[56] References Cited

U.S. PATENT DOCUMENTS

| | | | |
|---|---|---|---|
| 3,528,846 | 9/1970 | Celmer et al. | 428/317.9 |
| 4,348,452 | 9/1982 | Paolo et al. | 428/312.6 |
| 4,395,456 | 7/1983 | Jackson et al. | 428/312.6 |
| 4,442,164 | 4/1984 | Briggs et al. | 162/181.8 |

FOREIGN PATENT DOCUMENTS

| | | |
|---|---|---|
| 1001179 | 12/1976 | Canada . |
| 909332 | 10/1962 | United Kingdom . |
| 1149211 | 4/1969 | United Kingdom . |
| 1179631 | 1/1970 | United Kingdom . |
| 1201582 | 8/1970 | United Kingdom . |
| 1456641 | 11/1976 | United Kingdom . |
| 1456753 | 11/1976 | United Kingdom . |
| 1485828 | 9/1977 | United Kingdom . |
| 1499804 | 2/1978 | United Kingdom . |
| 1521197 | 8/1978 | United Kingdom . |
| 1521569 | 8/1978 | United Kingdom . |
| 2001282 | 1/1979 | United Kingdom . |
| 1552127 | 9/1979 | United Kingdom . |
| 2031043 | 4/1980 | United Kingdom . |
| 2040331 | 8/1980 | United Kingdom . |
| 1580277 | 12/1980 | United Kingdom . |
| 2050460 | 1/1981 | United Kingdom . |
| 2060728A | 5/1981 | United Kingdom . |

Primary Examiner—William J. Van Balen
Attorney, Agent, or Firm—Beveridge, DeGrandi & Weilacher

[57] ABSTRACT

A board of sandwich construction which comprises two outer preformed support membranes consisting of or comprising fibrous material, the said membranes having interposed therebetween an aerated intermediate layer comprising at least 70% by weight based on the dry board of an unfired clay which contains less than 20% by weight of expandable minerals and the intermediate layer also including fibres therein.

The boards of the present invention are intended mainly for use as plasterboard substitute.

17 Claims, 1 Drawing Figure

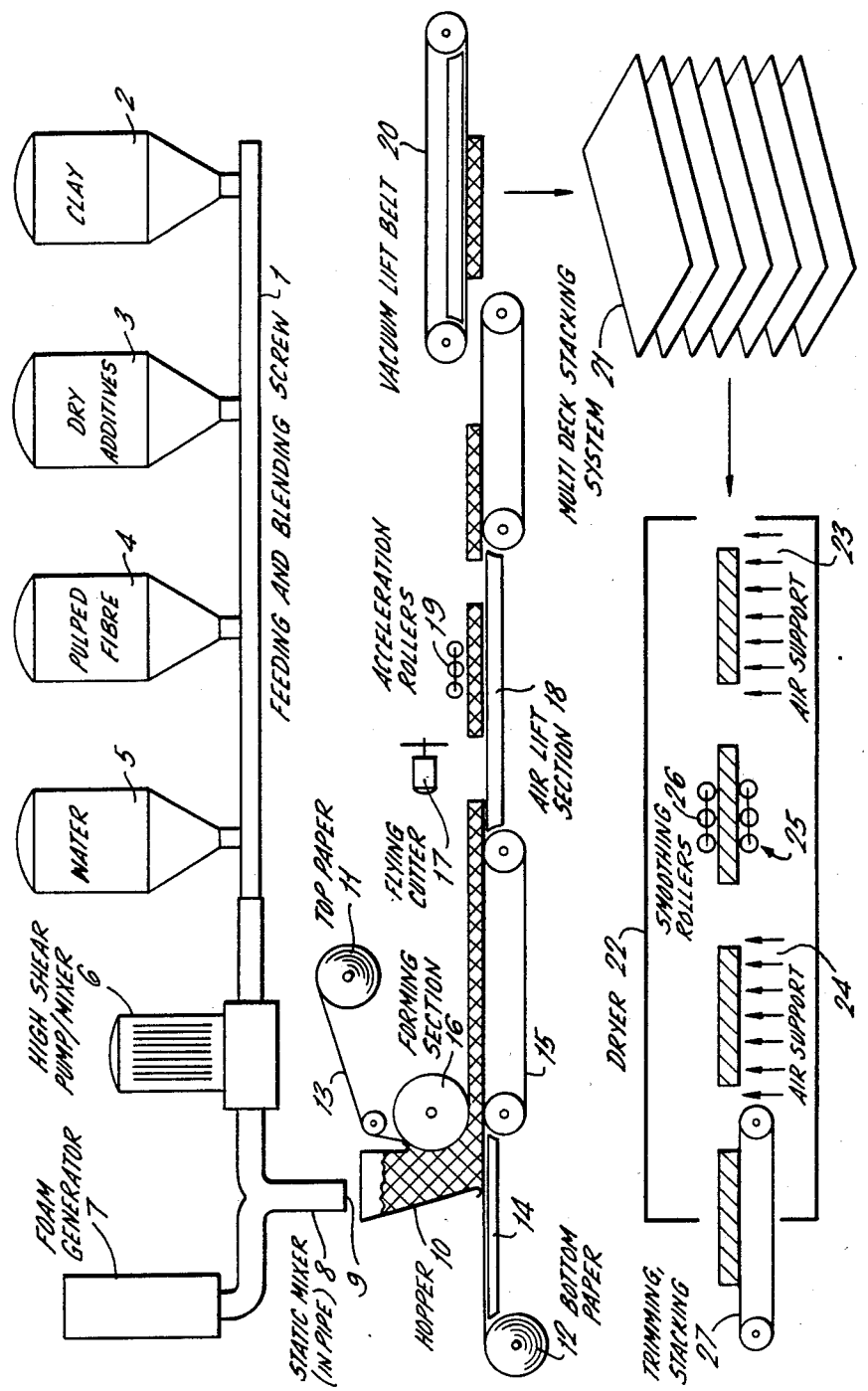

BOARDS

This invention relates to boards and is particularly, but not exclusively, concerned with boards intended for use as substitute materials for traditional plasterboard.

Traditional plasterboard is a board of sandwich construction, the outer two layers of this board being preformed membranes between which there is interposed an intermediate layer of gypsum plaster of calcium sulphate dihydrate.

We have now developed a clay based dry lining board which can be used instead of traditional plasterboard.

Accordingly, the present invention provides a board of sandwich construction which comprises two outer preformed support membranes consisting of or comprising fibrous material, the said membranes having interposed therebetween an aerated intermediate layer comprising at least 70% by weight based on the dry board of an unfired clay which contains less than 20% by weight of expandable minerals and the intermediate layer also including fibres therein.

The intermediate layer contains fibres, such as cellulosic fibres. Cellulosic fibres which may be used are paper fibres, raw wood pulp, jute, hemp, bagasse, coconut or straw. Paper fibres are the most preferred and in particular fibres formed from office waste paper or newspaper may be used. Fibres made from polymers, e.g., polypropylene, polyethylene or an acrylic polymer may also be used as may inorganic fibres from glass or mineral sources.

The intermediate layer may also contain a sizing agent to adhere the intermediate layer to the support membranes. The sizing agent may be a starch, with dextrin or corn starch being the most preferred starches for use.

The intermediate layer may additionally contain a deflocculant in order to reduce the water requirement, fluidise the composition and to ease the mixing of the different constituents of this layer into a substantially homogeneous form prior to the formation of the board. Preferred deflocculants are polyphosphates and phosphonates including sodium hexametaphosphate which is commercially available under the Trade Name "Calgon". Sodium hydroxide may also be used as a defloc-culant or in combination with other constituents in a defloculant system.

The aeration of the intermediate layer may be achieved in one of the following ways:
(i) whipping in the presence or absence of an unfoamed or foamed detergent;
(ii) air injection in the presence or absence of an unfoamed or foamed detergent; or
(iii) high shear mixing of the clay and other ingredients prior to mixing in the foamed detergent.

In a further preferred aspect of the present invention the intermediate layer contains the following constituents in the finished product, the percentages given being by weight based on the dry board:
(a) 70–95% by wt clay
(b) 0–15% by wt paper fibres
(c) 0–5% by wt starch
(d) 0–2% by wt deflocculant
(e) 0–1% by wt detergent
(f) 0–7% by wt free water By the term "clay" as used herein, is meant either a soil or a rock which, when suitably crushed and pulverised and upon the addition of a suitable quantity of water, forms a plastic body which can be shaped as required and will retain that shape. Clays contain quantities of the fine grained hydrous aluminium silicates commonly known as "clay minerals". The content of these minerals is usually in the range from 20 to 90%, but in exceptional cases may be higher or lower. The remainder of the clay is formed of coarser mineral particles, such as quartz, feldspar or carbonates and/or organic material.

It is to be understood that other non-clay mineral products may be added to the clay fraction to enhance the performance thereof. These non-clay materials may be sand, fine aggregate, silt, pulverised fuel ash etc.

The content of expandable clay minerals, particularly smectite, in the clays used in the invention should be as low as possible and preferably below 10% and more preferably below 5% by weight of the clay since these minerals increase the amount of atmospheric water absorbed by the clay and add to the cost of deflocculation.

Preferably the clays have a clay mineral content of 30% to 90% by wt, the clay minerals being mainly non-expandable minerals such as kaolinite, illite and chlorite. However, if the mineral content is high, then one or more of the above-identified non-clay minerals may be added.

On the other hand, if the clay is low in clay minerals, a portion of the non-clay minerals may conveniently be sieved out.

Conveniently the clay board made therewith has a density of 200 to 2400 $Kg/m^3$. More especially, the board has a density of 600 to 1600 $Kg/m^3$ and preferably a density of 800 to 1000 $Kg/m^3$.

Preferably the unfired clay is a normal brick making aluminosilicate clay and is composed of 10 to 70% by weight quartz, 90 to 30% by wt clay minerals and small amounts of feldspar, carbonates, etc., with a moisture content of up to 20%. Such materials may be subjected to any suitable grinding or milling process to give a particle size of 5 mm, preferably to a particle size of less than 1 mm.

The present invention also provides a method of manufacturing a board of sandwich construction as defined above, which method comprises the steps of:
(a) providing first and second preformed support membranes consisting of or comprising fibrous material;
(b) providing the said aerated intermediate layer as defined above between the preformed support membranes to form a composite board;
(c) subjecting the composite board to an applied pressure of up to 30 $N/mm^2$, typically less than $1N/mm^2$;
(d) cutting the resulting composite into discrete lengths; and
(e) drying the boards so produced; or
(f) drying and rolling the boards during drying to control the dimensions of the boards so produced.

Conveniently, a typical pressure of up to $1N/mm^2$ may be applied to the composite board during step (c) by pressing, rolling or extruding.

In a preferred method of forming a board of the invention a pulp of paper fibres, prepared by mixing paper fibres with water, is added to a mixture of the unfired clay, starch, deflocculant and water, and this mixture subjected to centrifugal high shear mixing, for example a Silverson 275L GPD mixer working at a shear rate of 400,000/sec. This high shear mixing breaks down the clay structure and homogenises the mixture which results in an increased strength of the dried core.

The aeration of the mixture, prior to application between the preformed support membranes, may be achieved by the addition thereto of a separately prepared detergent foam, or by one of the methods as hereinbefore specified.

The present invention will now be further described by way of specific example and with reference to the single accompanying drawing.

The board of the present invention may be manufactured using the apparatus illustrated in the drawing. A feeding and blending screw 1 is fed by a hopper 2 for unfired clay, a hopper 3 for the dry additives, i.e., starch and deflocculant, a hopper 4 for pulped paper fibre and a hopper 5 for water. These ingredients are passed by the feeding and blending screw 1 to a centrifugal high shear pump/mixer 6 where the clay structure is broken down and the ingredients are homogeneously mixed.

A detergent foam is prepared in foam generator 7 and this foam is passed with the homogeneously mixed ingredients from the high shear pump/mixer 6 to a static mixer 8 where they become intimately mixed. The mixture leaving the exit 9 of the static mixer is passed to hopper 10. Feed rolls 11 and 12 are provided for the top sheet 13 and bottom sheet 14 of paper. The bottom sheet of paper 14 is fed onto the upper run of an endless belt conveyor 15, whilst the top sheet of paper is fed around roller 16. The mixture from hopper is fed between the top sheet and bottom sheet of paper, whilst the distance between the endless belt conveyor and roller 16 determines the thickness of the intermediate layer.

The resulting composite board is cut into lengths by means of a cutter 17 and the individual boards are then passed through an air lift section 18 which includes a plurality of acceleration rollers 19. The boards then pass to a vacuum lift belt 20 before they are placed onto a spaced stack 21. The spaced stack of boards are then passed to a dryer 22. At stations 23 and 24 the boards are supported on an air bed and drying takes place. In between these stations, the boards are passed between a plurality of opposed rollers 25 and 26. This rolling process eliminates surface defects that may otherwise develop during drying due to shrinkage. The boards then pass to station 24 where further drying occurs and then onto another endless belt conveyor 27 which is only partially housed within the dryer. The boards leave the dryer and are then trimmed and stacked ready for despatch. In an alternative arrangement, however, where the boards do not require rolling, they pass straight from the station 23 to the station 24.

Whereas the board product provided by the present invention has been described as a substitute material for plasterboard, it is not intended that its use be so limited.

The paper used in the specifically described embodiments is the normal paper utilised in plasterboard manufacture and is between 0.3 and 0.7 mm in thickness, say 0.4 mm. It is envisaged that, although starch is added to the board composition, the paper may be ready sized for facilitating ease of adherence to the intermediate layer. The paper used in the examples is a reconstituted board having a weight of 150 to 350 gms/m$^2$, and preferably 240 gms/m$^2$.

It is further envisaged within the scope of the present invention that other grades and thicknesses of paper may advantageously be used and, as in traditional plasterboard manufacture, the paper may be wrapped about the longitudinal edges of the composite product by any suitable means.

The present invention will be further described with reference to the following Examples:

EXAMPLE 1

A board was prepared using the following proportions of material in the initial mix of materials for the intermediate layer:

100 parts by wt dry Weald clay
9.4 parts by wt waste paper (office waste)
0.6 parts by wt deflocculant (Calgon)
0.96 parts by wt starch
0.23 parts by wt detergent
75 parts by wt water The paper was pulped using part of the water and the materials, except the detergent, were mixed in a high shear mixer. The mixture was then aerated by mixing in a foam which had been generated using a 1:20 solution of Fisons QFS detergent in water. The density of the mixture after aeration was 1020 kg/m$^3$.

The board was formed by drawing the mixture between sheets of liner paper of weight 240 g/m$^2$ and dried. The composition of the intermediate layer of the board after drying was:

86.5% by wt clay
8.0% by wt waste paper
0.8% by wt starch
0.5% by wt deflocculant
0.2% by wt detergent
4.0% by wt free water The properties of the board were as follows:

| Thickness | 10.1 mm |
| Density | 869 kg/m$^3$ |
| Flexural Strength | 9.4 MPa |
| Modulus | 2.4 GPa |
| Impact Energy | 6.9 KJ/m$^2$ |

EXAMPLE 2

A board was prepared in the same manner as Example 1 but it was rolled during the drying operation. The properties of the board were as follows:

| Thickness | 9.45 mm |
| Density | 1087 Kg/m3 |
| Flexural Strength | 9.95 MPa |
| Modulus | 3.98 GPa |

EXAMPLE 3

A board was prepared in the same manner as Example 1, the initial mix of materials for the intermediate layer being as follows:

100 part by wt dry Weald Clay
4.6 parts by wt waste paper
0.96 parts by wt starch
0.4 parts by wt deflocculant (Calgon)
0.23 parts by wt detergent
75 parts by wt water The composition of the intermediate layer of the board after drying was:

90.7% by wt clay
4.0% by wt waste paper
0.8% by wt starch
0.35% by wt deflocculant 0.2% by wt detergent
4.0% by wt free water
The properties of the board were as follows:

| Thickness | 11.55 | mm |
|---|---|---|
| Density | 788 | Kg/m³ |
| Flexural Strength | 5.3 | MPa |
| Modulus | 1.3 | GPa |

EXAMPLE 4

A board was prepared using the following proportions of materials in the initial mix of materials for the intermediate layer:
  100 parts by wt Ball clay
  1.6 parts by wt waste paper (newsprint)
  1.1 parts by wt starch
  0.55 parts by wt detergent
  64 parts by wt water The paper was pulped as in Example 1 and the materials except the detergent were mixed in an orbital mixer. The detergent was then added and all of the materials were whipped to produce aeration thereof. The board was then formed as in Example 1.

The composition of the intermediate layer of the board after drying was:
  95% by wt clay
  1.5% by wt waste paper
  1.0% by wt starch
  0.5% by wt detergent
  2.0% by wt free water
The properties of the board were:

| Thickness | 7.9 | mm |
|---|---|---|
| Density | 1412 | Kg/m3 |
| Flexural Strength | 11.2 | MPa |
| Modulus | 3.0 | GPa |

By comparison with the properties of the above Examples 1 to 4, the properties of a typical commercially available plasterboard are:

| Thickness | 9.5 | mm |
|---|---|---|
| Density | 890 | Kg/m³ |
| Flexural Strength | 10.0 | MPa |
| Modulus | 2.7 | GPa |
| Impact Energy | 3.7 | KJ/m² |

EXAMPLE 5

A board was prepared using the following proportions of materials in the initial mix:
  60 Parts by wt clay (water content 3%)
  36 Parts by wt water
  0.2 Parts by wt detergent
  0.3 Parts by wt starch
  0.14 Parts by wt deflocculant
  0.2 Parts by wt sodium hydroxide
  2.5 Parts by wt shredded waste paper All the ingredients were pre-mixed in a batch mixer and then subsequently mixed and foamed in a continuous high shear mixer, the foaming being carried out by the injection of air during the mixing operation. The board was formed by drawing the mixture between sheets of liner paper of weight 240 gm/m², and dried. Rolling was carried out during the drying operation at a pressure of about 0.002 N/mm² to produce a flat board. The composition of the intermediate layer of the board after drying was:
  93.9 Parts by wt clay
  4.0 Parts by wt waste paper
  0.5 Parts by wt starch
  0.2 Parts by wt deflocculant
  0.3 Parts by wt sodium hydroxide
  0.5 Parts by wt free water
The properties of the board were as follows:

| Thickness | 10.0 | mm |
|---|---|---|
| Density | 900 | Kg/m3 |
| Flexural Strength | 10.6 | MPa |
| Modulus | 3.0 | GPa |
| Impact Energy | 4.7 | KJ/m2 |

We claim:

1. In a board of sandwich construction which comprises two outer preformed support membranes consisting of or comprising fibrous material, the said membranes having interposed therebetween an intermediate layer, the improvement which comprises the said intermediate layer being aerated, the said intermediate layer consisting of at least 70% by weight based on the dry board of an unfired clay which contains less than 20% by weight of expandable minerals and the said intermediate layer including fibres therein.

2. A board according to claim 1 wherein the fibres are cellulosic fibres.

3. A board according to claim 2 wherein the cellulosic fibres are paper fibres.

4. A board according to claim 1 wherein the intermediate layer additionally contains a sizing agent to adhere the intermediate layer to the support membranes.

5. A board according to claim 4 wherein the sizing agent is starch.

6. A board according to claim 5 wherein the starch is selected from the group consisting of dextrin and corn starch.

7. A board according to claim 1 wherein the intermediate layer additionally contains a deflocculant.

8. A board according to claim 1 wherein the intermediate layer has no more than 20% porosity of diameter greater than 0.2 mm.

9. A board according to claim 1 wherein the unfired clay contains less than 5% by weight of expandable minerals.

10. A board according to claim 1 wherein the intermediate layer contains the following constituents, the percentages given being by weight based on the dry board:
  (a) 70–95% by wt clay (as hereinbefore defined)
  (b) 0–15% by wt paper fibres
  (c) 0–5% by wt starch
  (d) 0–2.0% by wt deflocculant
  (e) 0–1.0% by wt detergent
  (f) 0–7% by wt water 11. A board according to claim 1 wherein the preformed support membranes are layers of a cellulosic material.

12. A board according to claim 11 wherein the cellulosic material is reconstituted paper board.

13. A method of manufacturing a board of sandwich construction as claimed in claim 1, which method consists essentially of the steps of:

(a) providing first and second preformed support membranes consisting of or comprising fibrous material;

(b) providing the said aerated intermediate layer as defined in claim 1 between the preformed support membranes to form a composite board;

(c) subjecting the composite board to an applied pressure of up to 30N/mm$^2$;

(d) cutting the resulting composite into discrete lengths; and (e) drying the boards so produced; or (f) drying and rolling the boards during drying to control the dimensions of the boards so produced.

14. Method according to claim 13 wherein in step (c) the composite board is subjected to an applied pressure of less than IN/mm$^2$.

15. Method according to claim 13 wherein the intermediate layer is prepared by adding a pulp of paper fibres to a mixture of an unfired clay, starch, deflocculant and water, subjecting this resulting mixture to centrifugal high shear mixing and aeration.

16. Method according to claim 13 wherein the intermediate layer is aerated by the addition thereto of a separately prepared foam detergent.

17. Method according to claim 13 wherein the intermediate layer is aerated by incorporating therein an unfoamed detergent and subjecting the mixture to air injection.

* * * * *